(12) United States Patent  
Anderson et al.

(10) Patent No.: US 9,192,242 B1
(45) Date of Patent: Nov. 24, 2015

(54) PORTABLE CHILD SAFETY RESTRAINT

(71) Applicants: Pearlie Anderson, Riverdale, GA (US);
Kathy Walters, Riverdale, GA (US);
Sonja Walters, Riverdale, GA (US)

(72) Inventors: Pearlie Anderson, Riverdale, GA (US);
Kathy Walters, Riverdale, GA (US);
Sonja Walters, Riverdale, GA (US)

( * ) Notice: Subject to any disclaimer, the term of this patent is extended or adjusted under 35 U.S.C. 154(b) by 0 days.

(21) Appl. No.: 14/338,980

(22) Filed: Jul. 23, 2014

(51) Int. Cl.
*A47D 15/00* (2006.01)
*A47C 15/00* (2006.01)
*B60R 22/10* (2006.01)

(52) U.S. Cl.
CPC ............. *A47C 15/006* (2013.01); *B60R 22/105* (2013.01)

(58) Field of Classification Search
CPC ............................ A47D 15/006; B60R 22/105
USPC .......................................... 297/467, 484, 485
See application file for complete search history.

(56) References Cited

U.S. PATENT DOCUMENTS

| 3,954,280 | A | * | 5/1976 | Roberts et al. ............. 280/801.2 |
| 4,637,622 | A | | 1/1987 | Burgard |
| 4,854,607 | A | | 8/1989 | Mandracchia et al. |
| 5,056,869 | A | * | 10/1991 | Morrison ...................... 297/485 |
| D343,257 | S | | 1/1994 | DiFloria et al. |
| 5,641,200 | A | * | 6/1997 | Howell ..................... 297/256.17 |
| 6,109,698 | A | * | 8/2000 | Perez ............................ 297/484 |
| 6,409,272 | B1 | * | 6/2002 | Martin et al. .................. 297/484 |
| 6,547,334 | B1 | * | 4/2003 | Girardin ....................... 297/484 |
| 6,857,430 | B2 | * | 2/2005 | Morris .......................... 128/869 |

* cited by examiner

*Primary Examiner* — Peter Brown
(74) *Attorney, Agent, or Firm* — Crossley Patent Law

(57) ABSTRACT

A portable child safety restraint including a shoulder harness with a pair of adjustable shoulder straps joined to a bottom connector strap. A crotch strap having a bottom strap joined to a pair of top connector straps connects the shoulder harness by a pair of chest buckles in the front of a child and by a bottom buckle in the rear of the child. The adjustable shoulder straps are used to secure the child's upper body to an independent structure in a seated position. A waist belt secures the child's lower body to the structure and prevents standing. Each of the shoulder straps includes a shoulder pad to cushion the child's shoulder from the straps. A harness chest clip joins the shoulder straps in the front of the child in a proper position on the child's shoulders to further restrain the child and support the child in an upright position.

4 Claims, 5 Drawing Sheets

PORTABLE CHILD SAFETY RESTRAINT

BACKGROUND OF THE INVENTION

Various types of safety devices and child restraints are known in the prior art. The intent of these inventions is to keep the child safe yet comfortable and prevent the child from standing, sliding downwardly, or falling. However, what is needed is a portable child safety restraint which includes upper body support and restrain as well as lower body restrain to secure a child's torso to a walker, a chair, stroller, or other similar structures in a comfortable, upright seated position while allowing free movement of arms and legs and to prevent the child from standing in or on the structure causing a fall.

FIELD OF THE INVENTION

The present invention relates to child safety devices and restraints, and more particularly, to a portable child safety restraint which includes an upper body restraint consisting of a shoulder harness and a crotch strap and a lower body restraint consisting of a waist belt. Both may be used to secure a child in or to a walker, chair, stroller, or other independent structure to support and limit the movement of the child's torso while still allowing comfortable movement of the arms and legs.

SUMMARY OF THE INVENTION

The general purpose of the present portable child safety restraint, described subsequently in greater detail, is to provide a portable child safety restraint which has many novel features that result in a portable child safety restraint which is not anticipated, rendered obvious, suggested, or even implied by prior art, either alone or in combination thereof.

To accomplish this, the present portable child safety restraint includes a shoulder harness, a crotch strap and a waist belt. The shoulder harness comprises a pair of adjustable shoulder straps joined to a bottom connector strap by a first ring in a Y-shape. The crotch strap comprises a bottom strap joined to a pair of top connector straps by a second ring in a Y-shape. The crotch strap connects the shoulder harness by a pair of chest buckles in the front of a child and by a bottom buckle in the rear of the child. The adjustable shoulder straps serve to secure the child to a structure such as a walker, a chair or a stroller in a seated position. The waist belt is used to further secure the child's lower body to the structure and to prevent standing. Each adjustable shoulder strap comprises a shoulder pad to cushion the child's shoulder from the straps. A harness chest clip joins the pair of adjustable shoulder straps in the front of the child in a proper position on the child's shoulders to further restrain the child and support the child in an upright position. The present portable child safety restraint secures the child's torso to the structure to provide support and limit movement of the torso while allowing free movement of the arms and legs. The present invention is safe, adaptable to various sizes of structures, portable, inexpensive, simple to use, durable, and can be used through various stages of child's development.

Thus has been broadly outlined the more important features of the present portable child safety restraint so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
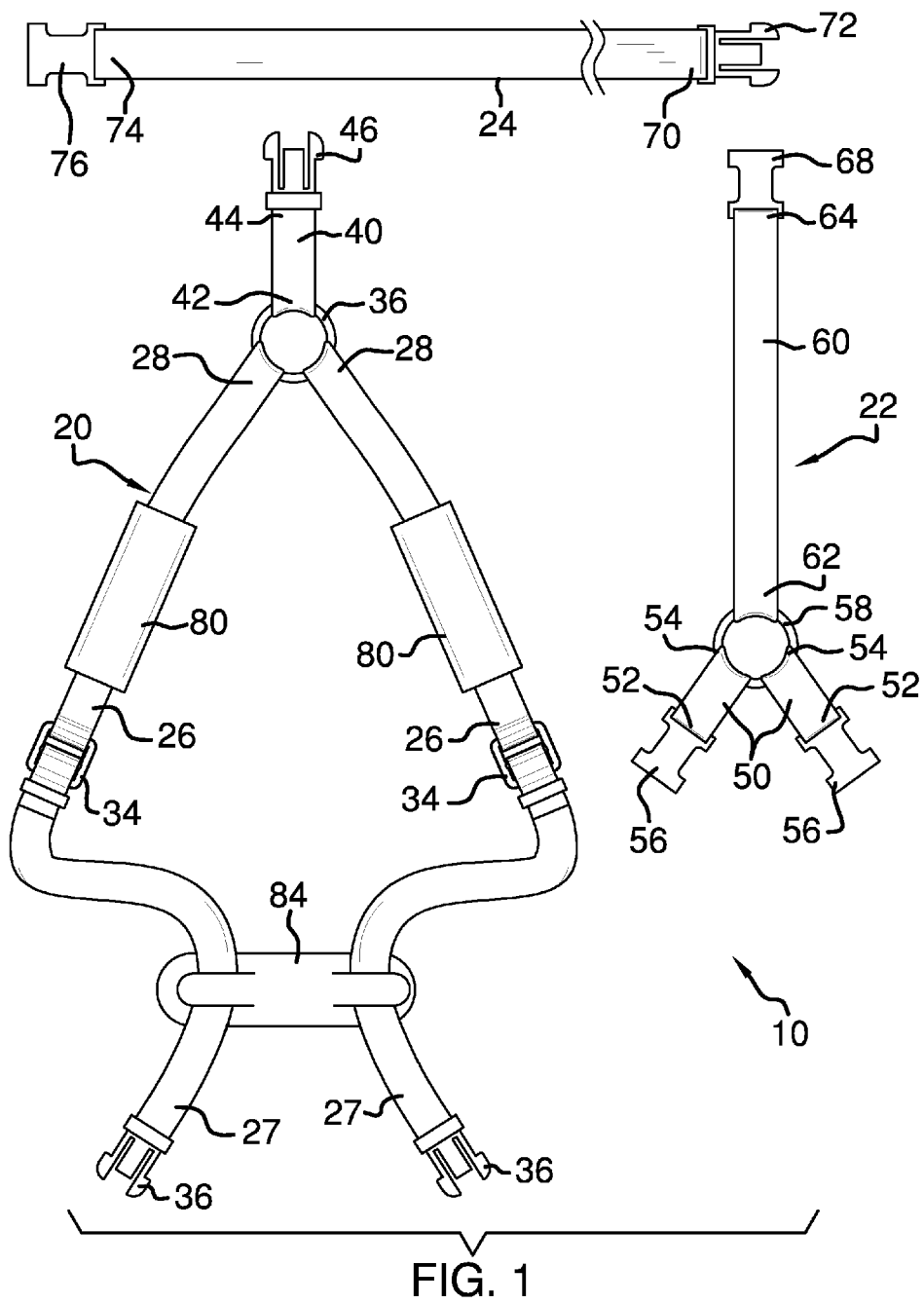
FIG. 1 is a front elevation view in an unassembled state.
Figure 2:
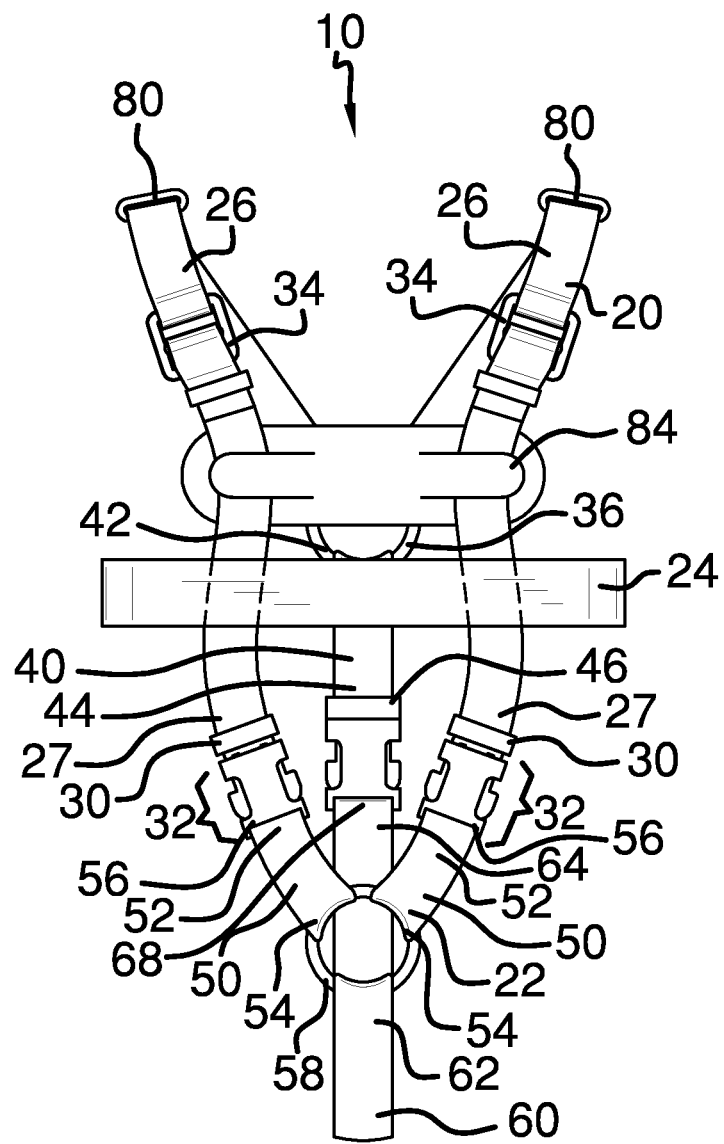
FIG. 2 is a front elevation view in an assembled state.
Figure 3:
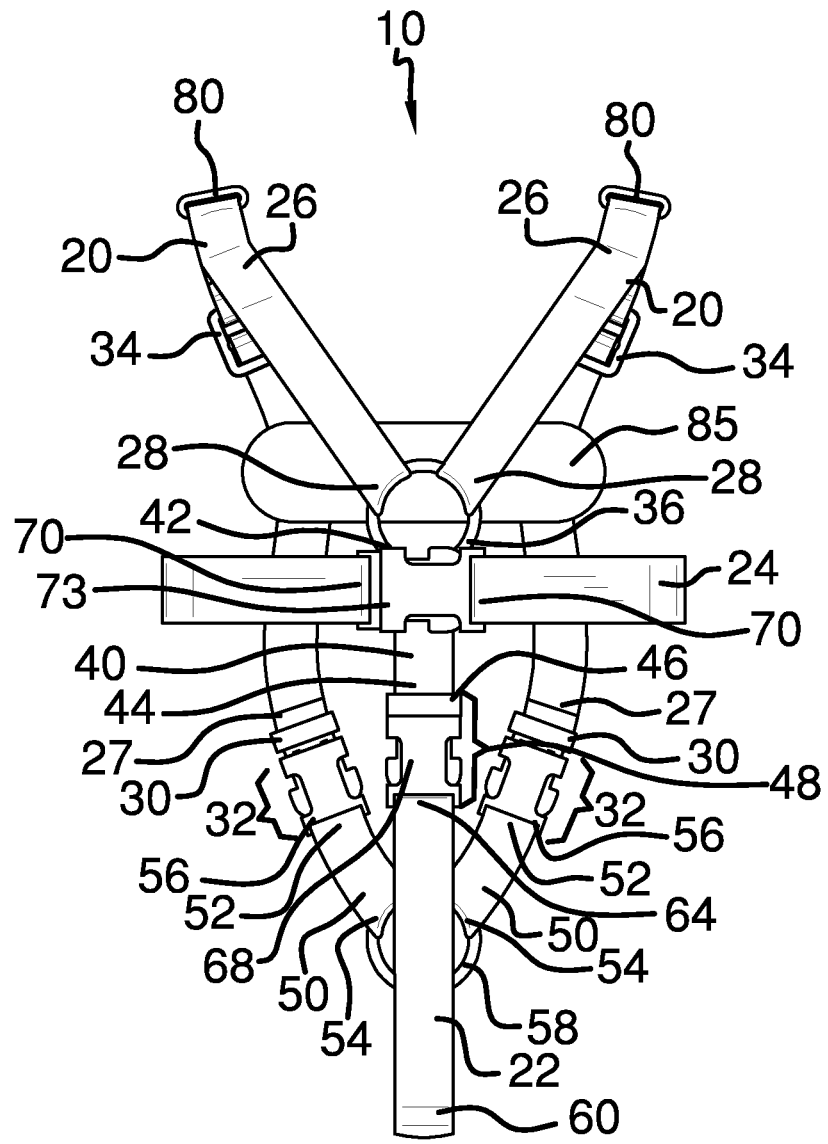
FIG. 3 is a rear elevation view.
Figure 4:
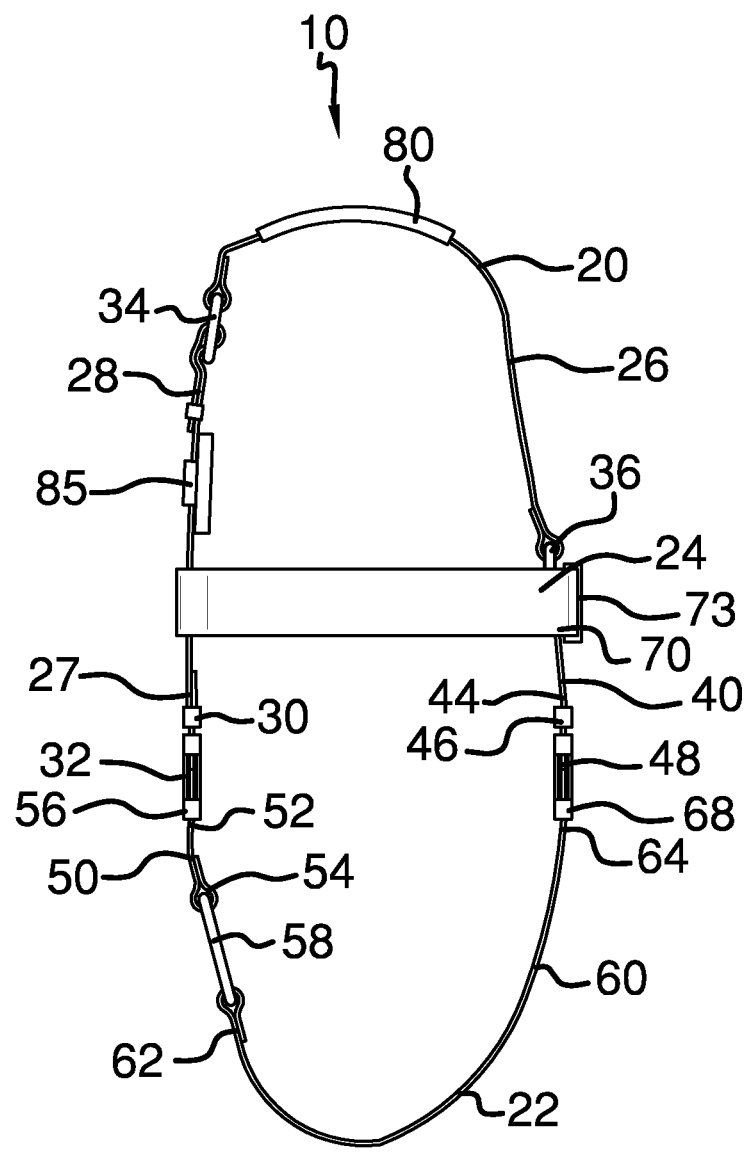
FIG. 4 is a side elevation view.
Figure 5:
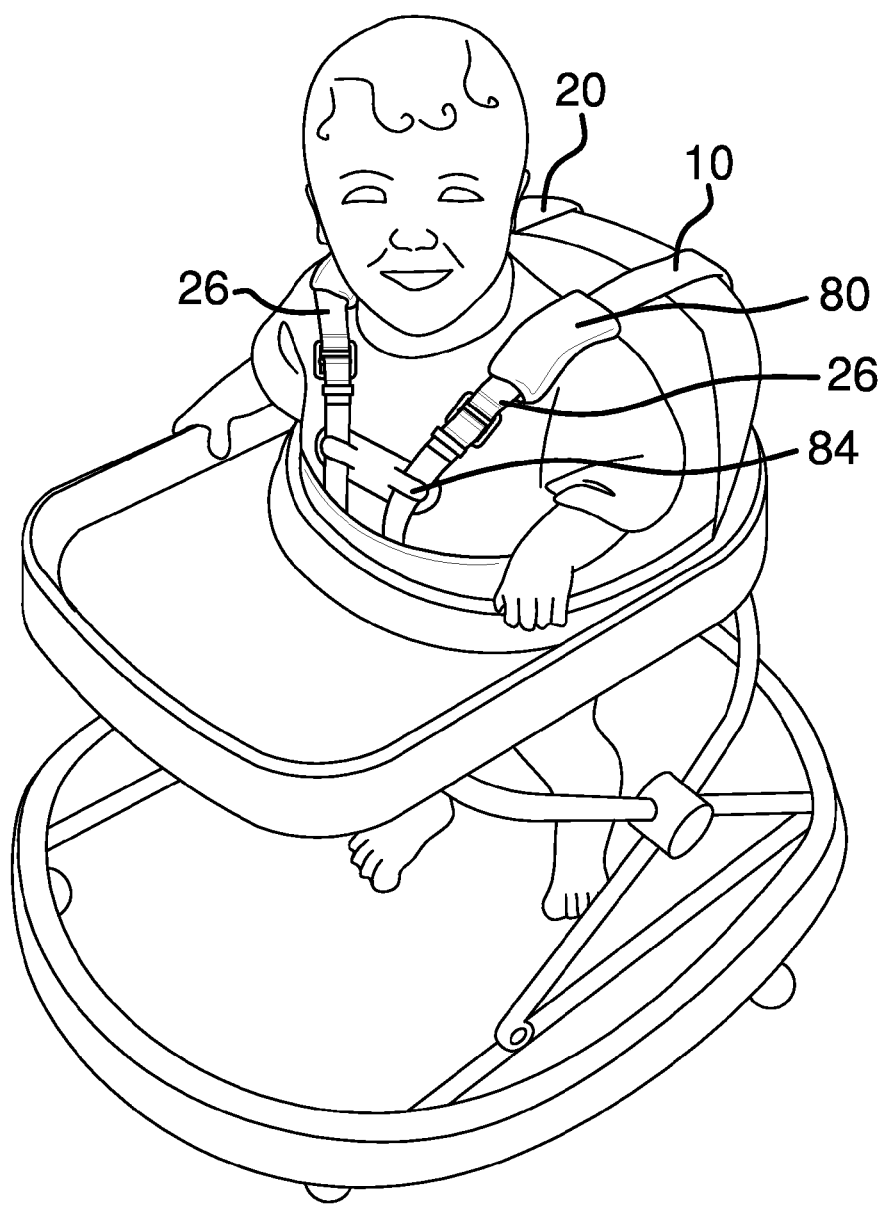
FIG. 5 is an in-use view.

With reference now to the drawings, and in particular FIGS. 1 through 5 thereof, an example of the instant portable child safety restraint employing the principles and concepts of the present portable child safety restraint and generally designated by the reference number 10 will be described.

Referring to FIGS. 1 through 5 the present portable child safety restraint 10 is illustrated. The portable child safety restraint 10 includes a shoulder harness 20, a crotch strap 22 and a waist belt 24. The shoulder harness 20 includes a pair of adjustable shoulders straps 26, each having a top end 27 and a bottom end 28. A first male end 30 of a chest buckle 32 is disposed on each top end 27. An adjustment buckle 34 is disposed proximal a midpoint of each shoulder strap 26 which allows adjustment of the length of the each adjustable shoulder strap 26. Each bottom end 28 is connected to a first ring 36. A bottom connector strap 40 having a first end 42 and a second end 44 connects to the first ring 36 at its first end 42. A second male end 46 of a bottom buckle 48 disposed on the second end 44. The crotch strap 22 includes a pair of top connector straps 50, each having a top crotch strap end 52 and bottom crotch strap end 54. A first female end 56 of the chest buckle 32 is disposed on each top crotch strap end 52. Each bottom crotch strap end 54 is connected to a second ring 58. A bottom strap 60 having a first bottom strap end 62 and a second bottom strap end 64 is connected to the second ring 56 on its first bottom strap end 62. A second female end 68 of the bottom buckle 48 is disposed on the second bottom strap end 64.

The shoulder harness 20 is configured to be worn over the shoulders of a child with the pair of adjustable shoulder straps 26 in the front of the child and the bottom connector strap 40 in the back of the child. The pair of adjustable shoulder straps 26 are adapted to overlie and surround an independent structure, such as a walker, a chair, or a stroller, rearwardly of an occupant, such that the straps secure the harness thereto. The crotch strap 22 is worn between the legs of the child with the pair of top connector straps 50 in the front of the child and the bottom strap 60 in the back of the child. The crotch strap 22 releasably secures the shoulder harness 20 to the child by engagement of each first male end 30 to each first female end 56 of each chest buckle 32 and by engagement of the second male end 46 and second female end 68 of the bottom buckle 48. The waist belt 24 has two belt ends 70 joined by of a belt buckle 73. The waist belt 24 is used to secure the child to the independent structure by engaging the belt buckle 73 around the waist of the child to further restrain the child to the independent structure to prevent assumption of the standing position. Each adjustable shoulder strap 26 comprises a shoulder pad 80 constructed of a soft fabric to cushion each adjustable shoulder strap and prevent injuries to the child's shoulders. A harness chest clip 85 is disposed on the pair of adjustable shoulder straps proximal to each top end 27. The harness chest clip 85 joins and properly positions the adjustable shoulder straps on the child's shoulders. The harness chest clip 85 supports the child in an upright, seated position, further restrains the child to the independent structure, and prevents the child from standing. The present invention is safe, portable, adaptable to various sizes of structures, inexpensive, simple to use, durable, and can be used through various stages of child's development.

What is claimed is:

1. A portable child safety restraint, the safety restraint comprising
a shoulder harness comprising:
- a pair of adjustable shoulder straps, each adjustable shoulder strap having:
  - a top end and a bottom end;
  - a first male end of a chest buckle disposed on each top end;
  - an adjustment buckle disposed proximal a midpoint of each shoulder strap, each adjustment buckle being configured to allow adjustment of the length of the each shoulder strap;
- a first ring;
- a bottom connector strap having:
  - a first end and a second end, the first end being connected to the first ring;
  - a second male end of a bottom buckle disposed on the second end;
  - wherein the bottom end of each adjustable shoulder strap is connected to the first ring;
a crotch strap having:
- a pair of top connector straps, each top connector strap having:
  - a top crotch strap end and bottom crotch strap end;
  - a first female end of the chest buckle disposed on each top crotch strap end;
- a second ring;
- a bottom strap, the bottom strap having a first bottom strap end and a second bottom strap end, the first bottom strap end being connected to the second ring; and
- a second female end of the bottom buckle disposed on the second bottom strap end;

wherein the bottom crotch strap end of each top connector strap is connected to the second ring;
wherein the shoulder harness is configured to be worn over the shoulders of a child with the pair of adjustable shoulder straps in the front of the child and the bottom connector strap in the back of the child;
wherein the shoulder straps are adapted to overlie and surround an independent structure rearwardly of an occupant, such that the straps secure the harness thereto;
wherein the crotch strap is configured to be worn between the legs of the child with the pair of top connector straps in the front of the child and the bottom strap in the back of the child, the crotch strap being configured to releasably secure the shoulder harness to the child; and
wherein upon engagement of each of the first male ends to each first female ends of each chest buckle and engagement of the second male end and second male end of the bottom buckle, the child is restrained to the independent structure.

2. The portable child safety restraint of claim 1 further comprising a waist belt having a first belt end and a second belt end joined by a belt buckle, the waist belt being configured to be secured to the independent structure and joined around the waist of the child to further restrain the child to the independent structure to prevent assumption of the standing position.

3. The portable child safety restraint of claim 1 wherein each shoulder strap comprises a shoulder pad, each shoulder pad being constructed of a soft fabric and configured to cushion each shoulder strap.

4. The portable child safety restrain of claim 1 wherein the shoulder harness further comprises a harness chest clip disposed on the pair of adjustable shoulder straps, the harness chest clip being configured to join and properly position the adjustable shoulder straps on the child's shoulders, wherein the harness chest clip is configured to further restrain the child to the independent structure and to support the child in an upright seated position.

* * * * *